A. BARKER.
Horse Detacher.
No. 162,517. Patented April 27, 1875.
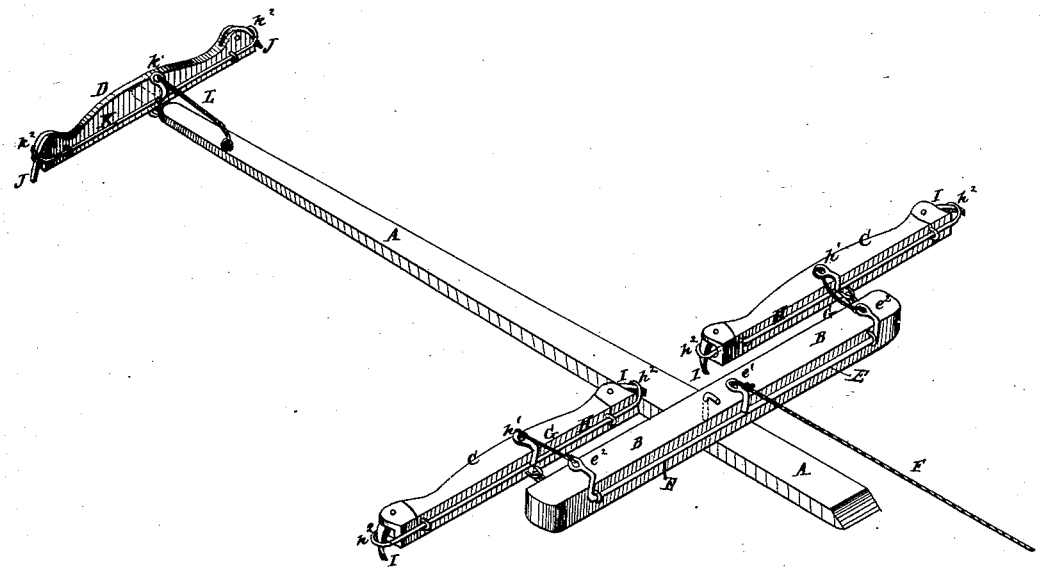
WITNESSES:
INVENTOR:
Amos Barker
BY
ATTORNEYS.

UNITED STATES PATENT OFFICE.

AMOS BARKER, OF NEBRASKA CITY, NEBRASKA.

IMPROVEMENT IN HORSE-DETACHERS.

Specification forming part of Letters Patent No. 162,517, dated April 27, 1875; application filed January 30, 1875.

*To all whom it may concern:*

Be it known that I, AMOS BARKER, of Nebraska City, in the county of Otoe and State of Nebraska, have invented a new and useful Improvement in Device for Detaching Horses from Vehicles, of which the following is a specification:

The figure is a detail perspective view of my improved horse-detacher.

The invention consists in the application, to the single-trees, of an armed vibrating rod, operated by cord or chain, in connection with pivoted hooks for attachment of the traces, as hereinafter described.

A represents the tongue of a vehicle, to which a double-tree, B, is pivoted in the usual manner. C are the single-trees, which are connected with the ends of the double-tree B in the usual manner. D is the neck-yoke, the ring of which is passed over the forward end of the tongue A in the usual manner. E is a rod that extends along the rear side of the double-tree B, and is secured in place by staples, or other convenient means that will allow it to turn freely. To the middle part of the rod E is rigidly attached a curved arm, $e^1$, which projects over the upper side of the double-tree B, and to the end of which is attached a cord, F, that extends back to the vehicle, where its other end is secured in such a way that it can be conveniently reached and operated by the driver, when desired. To the ends of the rod E are rigidly attached, or upon them are formed, curved arms $e^2$, which project over the upper side of the doubletree B, and to their ends are attached the ends of the short cords or chains G, the other ends of which are attached to to the ends of the curved arms $h'$, rigidly attached to the middle part of the rod H, and which project over the middle parts of the single-trees C. The rods H extend along the rear sides of the single-trees C, and are secured to said single-trees by staples, or by being placed through holes formed in the ferrules applied to the ends of the said single-trees C. Upon the ends of the rods H are formed curved or hook-arms $h^2$, which hook over half-circle hooks I, upon which the cockeyes of the traces are hooked, and which are pivoted to the ends of the single-trees C, or to ferrules attached to said ends. The half-circle hooks I are held in place, when sustaining the draft-strain, by the curved arms $h^2$ of the rods H. The cords or chains G may extend back to the vehicle, or they may be attached directly to the cord F, in which case the rod E need not be used. To the ends of the neck-yoke D, or to ferrules attached to said ends, are pivoted half-circle hooks J to receive the neck strap rings, and around which pass the curved arms $k^2$, formed upon the ends of the rod K, which extends along the rear side of the neck-yoke D, and is secured in place by staples or other convenient means. To the middle part of the rod K is rigidly attached a curved arm, $k^1$, that projects over the upper side of the neck-yoke D, and to the end of which is attached the end of a short cord or chain, L. The other end of the cord or chain, L, is secured to the tongue A by a staple or other convenient means. By this construction, by pulling upon the cord F the rods E and H will be turned, withdrawing the curved arms $h^2$ from the pivoted half-circle hooks I, and releasing the traces. As the traces are released, and the neck-yoke D moves forward upon the tongue A, the cord L will turn the rod K, withdrawing the curved arms $k^2$ from the pivoted half-circle hooks J, and allowing the neck-yoke to drop, and the horses will be entirely free from the vehicle.

Having thus described my invention, I claim as new and desire to secure by Letters Patent—

1. The combination of the armed rod H $h^1$ $h^2$, and the pivoted half-circle hooks, with the double-trees, substantially as shown and described.

2. The combination of the armed rod H $h^1$ $h^2$, the pivoted half-circle hooks I, and the cords or chains G, with the single-trees C, substantially as shown and described.

3. The combination of the armed rod E $e^1$ $e^2$, the armed rods H $h^1$ $h^2$, the cords or chains G, and the cord F, with the double-tree B, and the single-tree C, substantially as shown and described.

AMOS BARKER.

Witnesses:
ROBT. M. ELVIN,
ED. F. HOLMES.